United States Patent
Gunnarsson et al.

[11] Patent Number: 6,115,269
[45] Date of Patent: Sep. 5, 2000

[54] CONTROL EQUIPMENT FOR ACTIVE FILTERS AND A METHOD FOR REDUCTION OF HARMONICS IN A BIPOLAR DC LINK

[75] Inventors: Stefan Gunnarsson; Boris Nordström, both of Ludvika, Sweden

[73] Assignee: ABB AB, Vasteras, Sweden

[21] Appl. No.: 09/381,695

[22] PCT Filed: Jan. 27, 1999

[86] PCT No.: PCT/SE99/00105

§ 371 Date: Jan. 7, 2000

§ 102(e) Date: Jan. 7, 2000

[87] PCT Pub. No.: WO99/43067

PCT Pub. Date: Aug. 26, 1999

[30] Foreign Application Priority Data

Feb. 18, 1998 [SE] Sweden ................... 9800464

[51] Int. Cl.[7] .................. H02J 3/36; H02M 5/40
[52] U.S. Cl. ................... 363/35; 363/34; 363/51
[58] Field of Search ................... 363/34, 35, 37, 363/39, 40, 44, 45, 51; 307/105–107

[56] References Cited

U.S. PATENT DOCUMENTS

| | | | |
|---|---|---|---|
| 4,835,411 | 5/1989 | Takeda ................... | 307/105 |
| 5,296,764 | 3/1994 | Asplund et al. ................... | 307/521 |
| 5,666,275 | 9/1997 | Inokuchi et al. ................... | 363/35 |
| 5,701,241 | 12/1997 | Dofnas et al. ................... | 363/35 |

FOREIGN PATENT DOCUMENTS

WO 93/09586 5/1993 WIPO.
WO 94/14220 6/1994 WIPO.

*Primary Examiner*—Matthew Nguyen
*Attorney, Agent, or Firm*—Pollack, Vande Sande & Amernick, RLLP

[57] ABSTRACT

A bipolar converter station for conversion between alternating current and high-voltage direct current comprises a first and a second active filter (AF11, AF12), each with its own piece of control equipment (CE11, CE12). The filters are intended for reduction of harmonics in a dc link, connected to the converter station, with a first and a second pole line (PC1, PC2), and each filter generates, in dependence on a sum of harmonic currents in the respective pole line, an influencing quantity (IF11, IF12) and supplies this to the dc link. The control equipment comprises frequency-selecting means (BP, CTR) which influence the frequency content of the respective influencing quantity to lie substantially within one of a first and a second of at least two predetermined, mutually non-overlapping frequency bands (FR1, FR2). During bipolar operation of the converter station, the frequency-selecting means in the control equipment for the first active filter influence the frequency content of the influencing quantity, generated by this filter, to lie within the first frequency band and the frequency-selecting means in the control equipment for the second active filter influence the frequency content of the influencing quantity, generated by this filter, to lie within said second frequency band.

17 Claims, 5 Drawing Sheets

CONTROL EQUIPMENT FOR ACTIVE FILTERS AND A METHOD FOR REDUCTION OF HARMONICS IN A BIPOLAR DC LINK

TECHNICAL FIELD

The present invention relates to a pair of first and second control equipment for a first and a second active filter, respectively, in a bipolar converter station for conversion between alternating current and high-voltage direct current, the filters being intended for reduction of harmonics in a dc link connected to the converter station, and to a method for reduction of harmonics in a dc link, connected to a bipolar converter station, by means of a first and a second active filter.

Each one of the pieces of control equipment comprises frequency-selecting means which influence the frequency content of an influencing quantity, generated by the respective active filter, to essentially lie within one of a first and a second of at least two predetermined, mutually non-overlapping frequency bands.

BACKGROUND ART

A converter for conversion between alternating current and high-voltage direct current, connected between an ac link and a dc link, generates, through its mode of operation, harmonics in the current in the ac network and in the voltage of the dc link. The currents associated with the latter voltage harmonics, and in particular the so-called ground-mode current, constitute a source of disturbance for telecommunication equipment located in the vicinity of the dc link. To eliminate these disturbances to the greatest possible extent, passive shunt filters are often used in the dc link, tuned to frequencies which are integer multiples of a product of the pulse number of the converter and the system frequency in the ac network, as well as designed as high-pass filters. These filters are generally not capable of completely extinguishing harmonics in the dc link. The reasons therefor are, for example, drift in the system frequency and in component values in the filters, but also the fact that the filter impedance at resonance frequency is not always negligible compared with the impedance in the other parts of the system. Further, during commutations and because of phase asymmetries in the ac network, harmonics of other frequencies than those mentioned above are normally also generated.

The passive filters are therefore nowadays often supplemented with active filters, which supply to the dc link an influencing quantity in the form of a current or a voltage for the purpose of reducing the amplitude of the harmonics which are generated by the phenomena described above. By measuring the remaining harmonic content in the direct current, the supplied current or voltage may thus be given such a form that, in principle, it fully eliminates the harmonic content. Such a filter comprises a power amplifier which is controlled by control equipment which is supplied with a sensed value of the harmonics, usually an actual current value formed in dependence on the harmonic current in the dc link. The control equipment forms, in dependence on a difference of a reference value for the harmonics and their sensed value, a control signal which is supplied to the power amplifier. In dependence on the control signal, the power amplifier generates the influencing quantity and supplies this to the dc link as one of a series quantity or a shunt quantity. Such filter circuits are exemplified in L. Gyugyi and E. C. Strycula: Active AC Power Filters, IAS 76 Annual, Paper 19-C. The document describes filter circuits for ac networks, but circuits which, in principle, are similar may also be applied to a dc link. In practice, the influencing quantity is usually supplied as a shunt quantity in that the power amplifier is connected in parallel with the disturbance source, in this case the converter.

The control signal is formed by a controller, which usually has a proportional or a proportional/integrating characteristic, which controller is supplied with the above-mentioned difference of the reference value for the harmonics and their sensed value.

An embodiment of such a controller is described in the published international patent application WO 93/09585. The controller forms the control signal in the form of a pulse train, repetitively with a cycle time corresponding to the repetitiveness of the disturbance source, in this case the time between two commutations in the converter, and comprises delay filters for adaptation of the controller to time delays in the transfer function for the external circuit connected to the controller.

The controller may also comprise filter devices for reducing or eliminating, in its output signal, certain frequency components or frequency bands, for example within a lower frequency range, the disturbing influence of which on the surroundings is low but which require a high power output from the power amplifier to be able to be eliminated.

The unpublished Swedish patent application 9700897-3 describes control equipment for an active filter, comprising at least one, and generally a plurality of, control units arranged like each other, each one for reduction of a tone of a tone frequency $n\omega$ of the ac components of the direct current. In this connection, tone means an interference signal, for example a harmonic current, of the tone frequency $n\omega$, where $\omega$ designates the system frequency of the alternating-voltage network and n, the ordinal number of the tone, a real number separate from zero, preferably an integer, $n=n_1, n_2, \ldots n_m$. Especially in installations for transmission of high-voltage direct current, where the converters included, because of their mode of operation, generate, on their direct-voltage sides, harmonics of the ordinal numbers $q=kp$ to the system frequency of the alternating-voltage network, where p is the pulse number of the converter and k is a positive integer, the ordinal numbers may be chosen as integer multiples of the pulse number of the converter.

Each one of the control units is supplied with the actual current value and generates, in dependence thereon, an output signal. The control signal for the active filter is generated in dependence on this output signal, or in the event that the control equipment comprises a plurality of control units, in dependence on the sum of the outputs signals thereof, whereby a simultaneous reduction of the amplitude of a number of current harmonics of the tone frequencies $n\omega=n_1\omega, n_2\omega, \ldots n_m\omega$ is achieved.

Each one of the control units comprises a first frequency-transforming member which forms values of amplitude and phase position for the tone which is associated with the respective control unit. These values are then processed separately in a separate controller with proportional/integrating characteristic, whereupon the output signals from the two controllers are summed and an output signal with a frequency equal to the tone frequency associated with the controller is recreated. The transfer function of the control unit is adapted, with respect to amplitude and phase position, to the transfer function for the external circuit connected to the control unit.

A converter station intended for bipolar operation essentially comprises two converters, which are series-connected on the dc side, and generates, in relation to ground, a direct voltage with positive polarity and a direct voltage with negative polarity (FIG. 1). The interconnecting point between the converters is connected to ground via an electrode line and a dc link, comprising two pole lines, is energized with the positive and the negative voltage, respectively. During bipolar operation, the current through the electrode line is zero or near zero and the power is transmitted via the pole lines. Only in exceptional cases, in case of a fault on or maintenance of a pole, the station is used in unipolar operation, in which case the dc circuit consists of one of the pole lines and the ground connection to an additional station connected to the pole line.

In converter stations of the above kind, an active filter is usually connected between each of the pole lines and ground, whereby the purpose of the control of the filters is to reduce the harmonic content in the ground-mode current. Each one of the pieces of control equipment of the filters is adapted to form the control signal in dependence on a sum of the harmonic currents of both pole lines, with the purpose of reducing this sum of harmonic currents. Studies have shown that, particularly in this operating case, where thus both pieces of control equipment are supplied with the same actual current values, interference phenomena may arise between the filters, characterized in that each one of the filters generates influencing quantities resulting in harmonic currents with a certain frequency content, which in turn the second filter strives to reduce by forming an influencing quantity with a corresponding frequency content. This phenomenon leads to an unstable control of the harmonic content in the dc link.

SUMMARY OF THE INVENTION

The object of the invention is to achieve a method of the kind mentioned in the introductory part of the description, which allows a stable and efficient reduction of harmonics in the ground-mode current during bipolar operation of the converter station, as well as a device for carrying out the method.

According to the invention, this is achieved in that each piece of control equipment comprises frequency-selecting means which influence the frequency content in an influencing quantity, generated by the respective active filter, to substantially fall within one of a first and a second of at least two predetermined, mutually non-overlapping frequency bands.

Advantageous improvements of the invention will become clear from the following description and claims.

BRIEF DESCRIPTION OF THE DRAWINGS

The invention will be described in greater detail by description of embodiments with reference to the accompanying drawings, which are all schematic and in the form of single-line diagrams and block diagrams, respectively, and wherein FIG. 5 shows an embodiment of control equipment comprising frequency-selecting means according to the invention, in a converter station according to FIG. 2, FIGS. 6A–6D illustrate the frequency content of influencing quantities generated by active filters with a pair of control equipment according to the invention, in an embodiment of an installation according to FIG. 1, and FIGS. 7A–7D illustrate the frequency content of influencing quantities generated by active filters with a pair of control equipment according to the invention, comprising single-tone controllers, in an embodiment of an installation according to FIG. 1.

DESCRIPTION OF THE PREFERRED EMBODIMENTS

The following description relates both to the method and to the device.

The block diagrams show measured values and diagrams for forming certain calculating values which are used in other blocks shown. Interconnecting lines between these measured values and these blocks have in certain cases been omitted in order not to burden the drawings, but it is to be understood that the respective calculating values are fetched from those blocks in which they are formed and that measured values are formed in some way known per se by sensing of the corresponding quantities in the installation for transmission of high-voltage direct current.

Further, it is to be understood that, although the blocks shown in the figures are referred to as units, members, filtering members, etc., these are to be understood as means for achieving the desired functions, especially in those cases where their functions are implemented as software in, for example, microprocessors.

Figure 1:
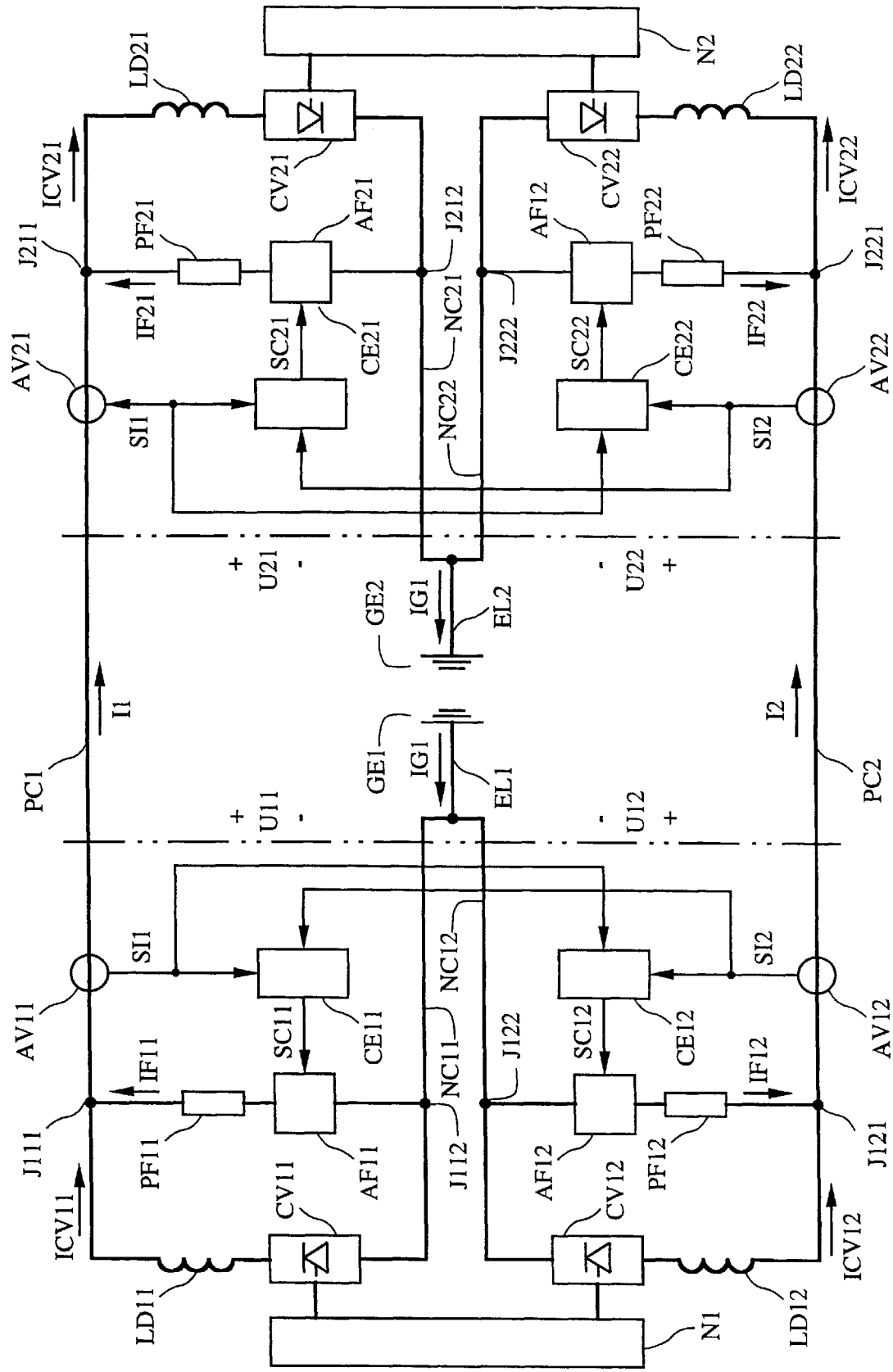
FIG. 1 shows a bipolar installation for transmission of high-voltage direct current with active filters connected to a dc link.

FIG. 1 illustrates, in the form of a single-line diagram, a known configuration of a bipolar installation for transmission of high-voltage direct current. A bipolar converter station comprises a converter CV11 and a converter CV12, each being connected on its ac side to an ac network N1. The converters are of a known design and, although not specifically shown in the figure, for example arranged in a 12-pulse connection. Converter transformers, ac filters and other ac apparatus conventionally arranged for such a converter station are assumed to be comprised in the ac network. The converters are series-connected on their dc sides by means of two neutral conductors NC11 and NC12, respectively, and the interconnecting point between the neutral conductors is connected, via an electrode line EL1, to a grounding electrode GE1. The converter CV11 is connected, by way of a smoothing inductor LD11, to a first pole line PC1 and the converter CV12 is connected, by way of a smoothing inductor LD12, to a second pole line PC2. A current ICV11 flows through the converter CV11 and a current ICV12 flows through the converter CV12. Between a connection point J111 on the pole line PC1 and a connection point J112 on the neutral conductor NC11, a series circuit comprising a passive filter PF11 and a first active filter AF11 is connected. The current I1 in the pole line consists of a dc component and a harmonic current and is sensed with a first current-sensing member AV11, which as output signal SI1 forms an actual current value in dependence on the harmonic current. The actual current value SI1 is supplied to a first piece of control equipment CE11, which, in dependence thereon, forms a control signal SC11 for the first active filter. In dependence on the control signal, the active filter forms an influencing quantity, in this embodiment of the installation in the form of a filter current IF11, which, at the connection point J111, is added to the current ICV11 through the converter. The current I1 in the pole line PC1 thus consists of the sum of the two currents ICV11 and IF11.

A series circuit comprising a passive filter PF12 and a second active filter AF12 is connected between a connection point J121 on the pole line PC2 and a connection point J122 on the neutral conductor NC12. A second current-sensing member AV12 forms, in a manner similar to what is mentioned above, an actual current value SI2 in dependence on a harmonic current in the pole line PC2, which actual current value is supplied to a second piece of control equipment CE12, which, in dependence thereon, forms a control signal SC12 for the second active filter AF12. In dependence on the control signal SC12, the second active filter forms an influencing quantity, in this embodiment of the installation in the form of a filter current IF12, which at the connection point J121 is added to the current IC12 through the converter. The current I2 in the pole line PC2 thus consists of the sum of the two currents ICV12 and IF12.

FIG. 1 further shows an additional bipolar converter station comprising a converter CV21 and a converter CV22, each one on their ac sides connected to an ac network N2. The converter CV21 is connected, via a smoothing inductor LD21, to the first pole line PC1 and the converter CV22 is connected, via a smoothing inductor LD22, to the second pole line PC2. The converters are connected in series on their dc sides by means of two neutral conductors NC21 and NC22, respectively, and the interconnecting point between the neutral conductors is connected to a grounding electrode GE2 via an electrode line EL2. Otherwise, this converter station is composed in the same way as the one described above, and the description above is applicable when, in reference numerals for corresponding blocks, currents and signals, index 11 is replaced by index 21 and index 12 by index 22.

The system frequency of the ac network is, in the following, designated ω.

In the embodiment of the installation according to FIG. 1, the pieces of control equipment for the active filters are adapted for reduction of the harmonic content in the ground-mode current, which, with reference directions for the currents in the pole lines as chosen according to the figure, is defined as half the sum of these currents. All the pieces of control equipment are therefore supplied with both the actual current value SI1 and the actual current value SI2 and are adapted to form the control signal in dependence on the sum of these two actual current values.

Conventionally, the pieces of control equipment for the active filters, in an installation as the one described with reference to FIG. 1, are arranged such that each one of the active filters generates an influencing quantity with a frequency content corresponding to the frequency content in the harmonic current. As mentioned above, certain frequency components or frequency bands are possibly suppressed, for example within a lower frequency range, to reduce the power output from the power amplifier. For this purpose, these frequency components or frequency bands are then suppressed in a similar manner for all the active filters included in the installation.

According to the invention, each piece of control equipment is now adapted to comprise frequency-selecting means influencing the frequency content of the respective influencing quantity to essentially lie within one of a first and a second of at least two predetermined, mutually non-overlapping frequency bands. During bipolar operation of the converter station, the frequency selecting means in the control equipment for the first active filter are adapted to influence the frequency content of the influencing quantity generated by this filter to lie within the first frequency band and the frequency-selecting means in the control equipment for the second active filter to influence the frequency content of the influencing quantity generated by this filter to lie within the second frequency band.

Figure 6A:
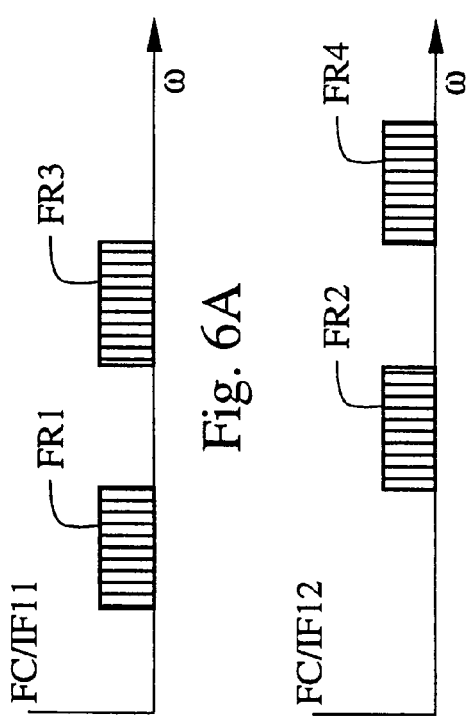
Figure 6B:
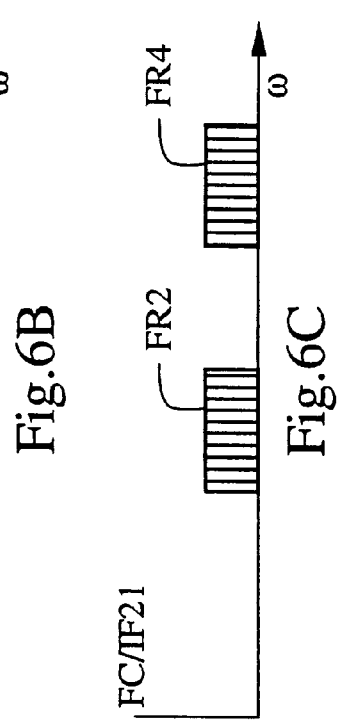

This is illustrated in FIGS. 6A and 6B, the horizontal axes of which are graded in frequency ω. In FIG. 6A, where the designation FC/IF11 means frequency content in the influencing quantity generated by the first active filter, that is, in the embodiment of the installation described with reference to FIG. 1, in the filter current IF11, a first frequency band FR1 is shown, and in FIG. 6B, where the designation FC/IF12 means frequency content in the influencing quantity generated by the second active filter, that is, in this case in the filter current IF12, a second frequency band FR2 is shown. The figures also illustrate the fact that the two frequency bands mentioned are chosen so as not to overlap each other.

Figure 2:
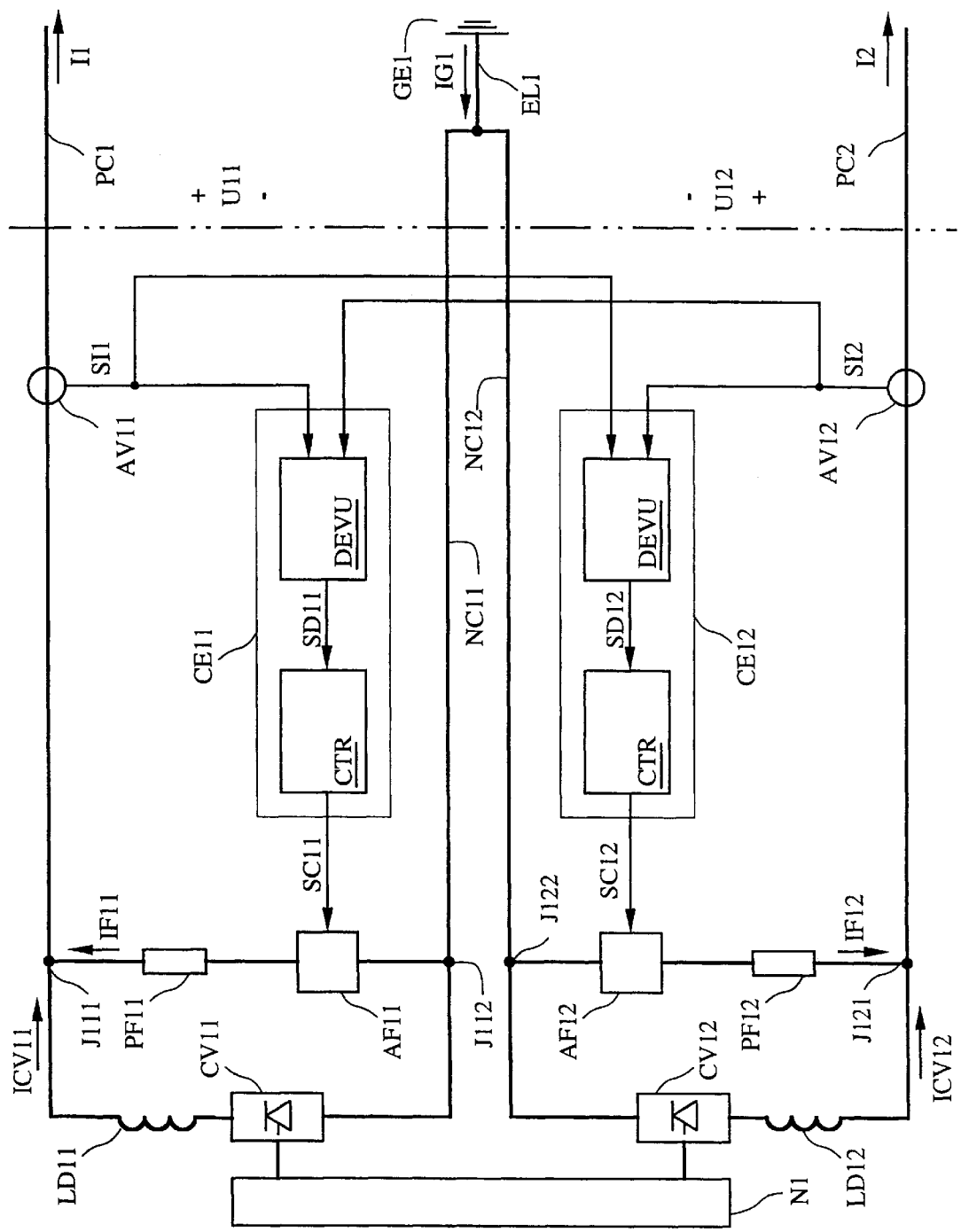
FIG. 2 shows a bipolar converter station in an installation according to FIG. 1.

FIG. 2 shows in more detail the pieces of control equipment for the active filters in a bipolar converter station in an installation according to FIG. 1. Otherwise, FIG. 2 corresponds to the lefthand part of FIG. 1 and elements with the same reference numerals are of the same kind in both figures. Each one of the pieces of control equipment CE11 and CE12 comprise a deviation-forming unit DEVU, which is supplied with the actual current values SI1 and SI2 (in this embodiment it is assumed that the active filters, as mentioned above, are adapted for reduction of harmonics in the ground-mode current). The respective deviation-forming unit forms a deviation signal, in the figure designated SD11 and SD12, respectively, in dependence on the difference of a reference value signal REF (not shown in this figure) for the harmonics and the sum of the actual current values. Each one of the pieces of control equipment further comprises a control device CTR, which is supplied with the respective deviation signal and, in dependence thereon, forms a control signal, in the figure designated SC11 and SC12, respectively, for respectively the first and the second active filter.

Figure 3:
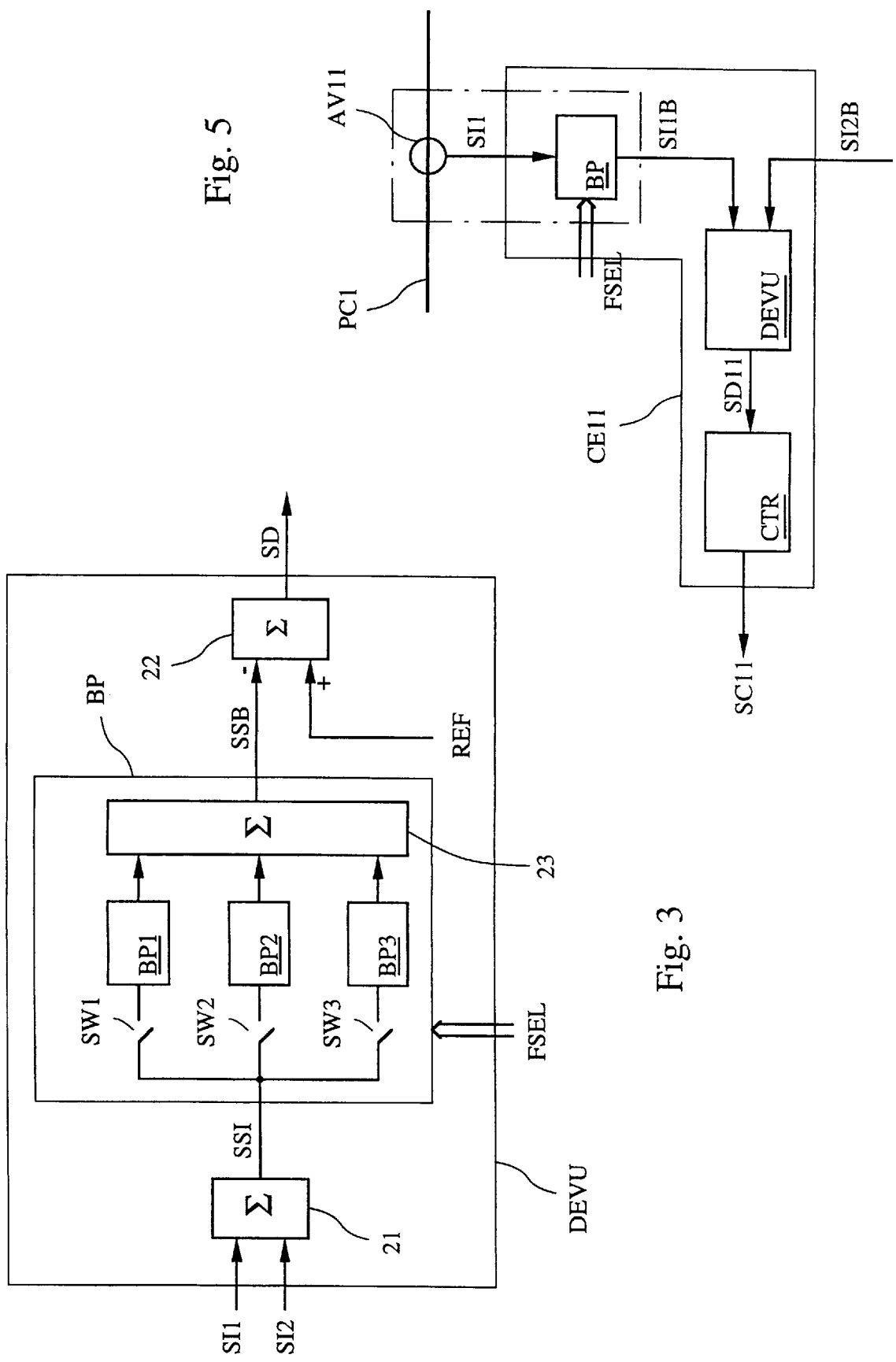
FIG. 3 shows an embodiment of a deviation-forming unit comprising frequency-selecting means according to the invention, in a converter station according to FIG. 2.

FIG. 3 illustrates an embodiment of the invention in which the frequency-selecting means are comprised in the deviation-forming unit. The actual current values SI1 and SI2 are summed in a summing member 21 which forms a sum actual value SSI. The sum actual value is supplied to a band-pass filtering unit BP, which, in some manner known per se, is adapted to forward, as output signal SSB, those components of the supplied signal which have a chosen frequency content, for example those which lie within the above-mentioned first frequency band, but to block the other components. This is schematically illustrated in the figure by—in this embodiment—three band-pass filtering members BP1, BP2 and BP3, respectively, comprised in the band-pass filtering unit. Each one of the band-pass filtering members is adapted to forward, in some manner known per se, in its output signal those components of the supplied signal which lie within a certain frequency band, but to block other components. Each one of these members is supplied with the sum actual value via a switching member SW1, SW2 and SW3, respectively, which may be influenced in dependence on an order signal FSEL. A summing member 23 is supplied with the output signals from all the band-pass filtering members and forms the output signal SSB from the band-pass filtering unit as the sum of the latter output signals.

The output signal SSB from the band-pass filtering unit and the above-mentioned reference-value signal REF are supplied to a summing member 22, which as output signal forms the deviation signal SD as the difference of the reference value signal and the output signal SSB. The reference value signal is preferably given the value zero.

For example, the band-pass filtering member BP1 in the first piece of control equipment is adapted to forward components with a frequency content within the first frequency band and the band-pass filtering member BP2 in the second piece of control equipment is adapted to forward components with a frequency content within the second frequency band. If, in the first piece of control equipment, the switching member SW1 is closed whereas the other switching members are open, and in the second piece of control equipment the switching member SW2 is closed whereas the other switching members are open, the first active filter will thus, on the first pole line, supply an influencing quantity, generated by this filter, with a frequency content which is within the first frequency band and the second active filter will supply, on the second pole line, an influencing quantity, generated by this filter, with a frequency content which is within the second frequency band.

Figure 4:
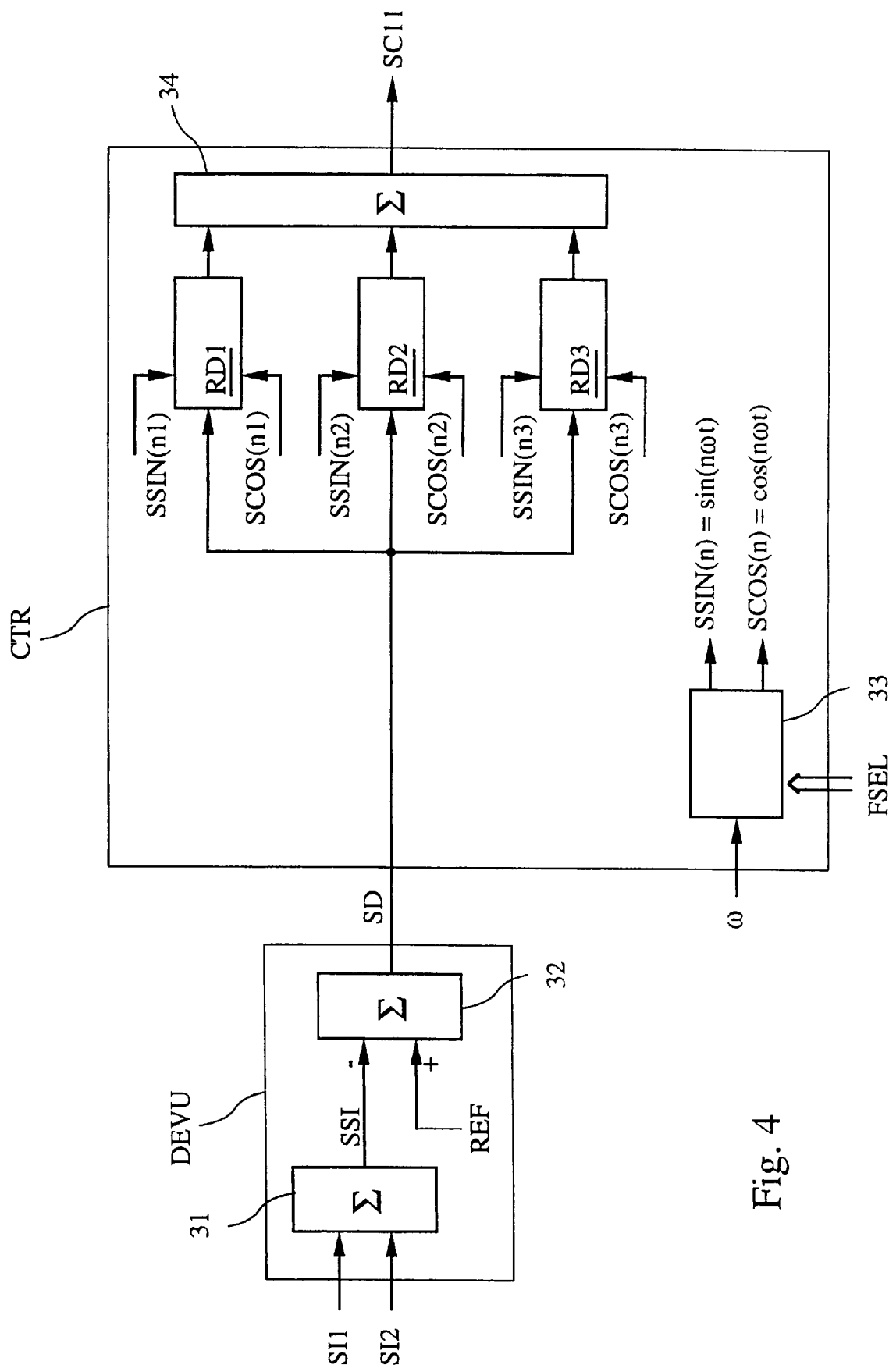
FIG. 4 shows an embodiment of a deviation-forming unit and a control unit comprising frequency-selecting means according to the invention, in a converter station according to FIG. 2.

FIG. 4 illustrates an embodiment of the invention in which the frequency-selecting means are comprised in the control device CTR. The actual current values SI1 and SI2 are supplied to a summing member 31 which form the sum actual value SSI as output signal. The sum actual value and a reference value signal REF are supplied to a summing member 32, which forms, as output signal, a deviation signal SD in dependence on the difference of the reference value signal and the sum actual value. The control device comprises a plurality, in this embodiment three, of control units RD1, RD2 and RD3, respectively, mutually composed in a similar manner and of the same kind as those described in the introductory part of the description with reference to the mention of the unpublished Swedish patent application 9700897-3, each one for reduction of a tone of the tone frequency $n\omega$ in the ground-mode current. The deviation signal, which in this embodiment thus, in principle, contains all the harmonics occurring in the currents I1 and I2, is supplied to each one of the control units. A signal-generating member 33 forms, in a manner known per se, for each ordinal number n a sine signal $SSIN(n)=\sin(n\omega t)$ and a cosine signal $SCOS(n)=\cos(n\omega t)$, in dependence on a supplied value of the system frequency $\omega$ of the ac network and on an order signal FSEL, containing information about at least one and in general a plurality of ordinal numbers n for one or more tones.

Each one of the control units forms, in a known manner, for example in the manner described in the introduction, an output signal in dependence on the deviation signal. The output signals from all the control units are supplied to a summing member 34, which, as output signal, forms the control signal for the active filter associated with the respective control equipment, in the figure marked with SC11 for the first active filter, in dependence on the sum of the output signals of the control units.

Figure 7A:
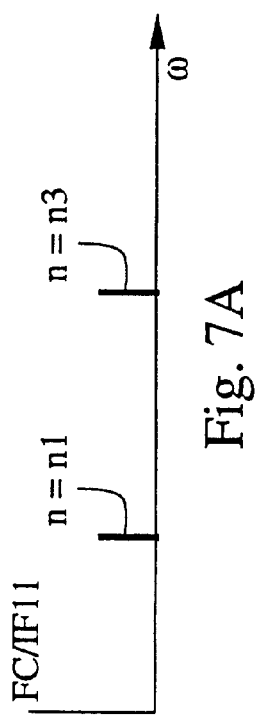
Figure 7B:
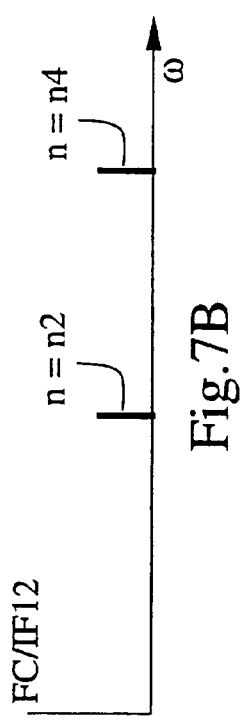

If, in this connection, in the first piece of control equipment, sine and cosine signals corresponding to the ordinal number $n=n_1$ are formed and supplied to the control unit RD1, and, in the second piece of control equipment, sine and cosine signals corresponding to the ordinal number $n=n_2$ are formed and supplied to the control unit RD2, the first active filter will, on the first pole line, supply an influencing quantity, generated by this filter, with a frequency content corresponding to the frequency of the tone $n\omega=n_1\omega$ and the second active will supply, on the second pole line, an influencing quantity, generated by this filter, with a frequency content corresponding to the frequency of the tone $n\omega=n_2\omega$. This is illustrated in FIGS. 7A and 7B, to which otherwise the same description as for FIGS. 6A and 6B applies. FIGS. 7A and 7B also illustrate the fact that the two ordinal numbers mentioned are chosen so as not to coincide.

Another embodiment of the invention is shown in FIG. 5 and illustrates the case where the frequency-selecting means are arranged at the respective current-sensing member. A band-pass filtering unit BP, which may be of the same kind as that described with reference to FIG. 3, is supplied with the actual current value SI1 from the current-sensing member AV11. The output signal from the band-pass filtering unit, in the figure marked with SI1B, and a corresponding output signal SI2B, formed in similar manner in dependence on the current I2 in the second pole line PC2, are supplied to a deviation-forming unit DEVU. In this embodiment, this unit may be of the same kind as that described with reference to FIG. 4, with the only difference that, instead of being supplied with the actual current values SI1 and SI2, the deviation-forming unit is supplied with the output signals SI1B and SI2B from the respective band-pass filtering units. These band-pass filtering units are comprised in the control equipment, but in this embodiment they are physically located at the respective current-sensing member, which in the figure is marked with a dash-dotted line.

In an advantageous embodiment of the invention, the frequency-selecting means, as illustrated in FIGS. 3, 4, 6 and 7, may be designed such that each of them influences the frequency content of the influencing quantity, generated by the respective filter, to lie within at least also a third predetermined frequency band FR3, not overlapping the first or the second frequency band.

In an embodiment illustrated in FIG. 3, the band-pass filtering member BP3 in the first control equipment is adapted to forward components with a frequency content within the third frequency band. If, in this context, in the first piece of control equipment, both the switching member SW1 and the switching member SW3 are closed whereas the switching member SW2 is open, and in the second piece of control equipment the switching member SW2 is closed whereas the other switching members are open, the first active filter will thus, on the first pole line, supply an influencing quantity, generated by this filter, with a frequency content which lies within the first frequency band and within the third frequency band, whereas the second active filter supplies, on the second pole line, an influencing quantity generated by this filter, with a frequency content which lies within the second frequency band. This is illustrated in FIGS. 6A and 6B. In FIG. 6A, the third frequency band FR3 is shown, which is chosen so as not to overlap the first or the second frequency band, in this embodiment such that the second frequency band is located between the first and third frequency bands.

It is realized from the above description that, by comprising in the band-pass filtering unit BP further band-pass filtering members of the same kind as those described above, BP1, BP2 and BP3, as well as switching members which may be influenced in dependence on the order signal FSEL, both the first and the second active filter may be adapted to supply, on the respective pole lines, an influencing quantity with a frequency content which lies within a desired number of frequency bands, whereby these are chosen so as not to overlap each other. This is illustrated in FIG. 6B in that the second active filter supplies, on the second pole line, an influencing quantity, generated by this filter, with a frequency content which lies within a fourth frequency band FR4.

Likewise, it is realized from the above description that the control unit, described with reference to FIG. 4, in analogous manner may be adapted to comprise further control units for an additional number of tones, such a further control unit RD3 being shown in the figure. FIGS. 7A and 7B illustrate that the first active filter, supplies, on the first pole line, an influencing quantity, generated by this filter, with a frequency content corresponding to the frequency for a tone with the ordinal number $n=n_1$ and the frequency for a tone with the ordinal number $n=n_3$, and that the second active filter supplies, on the second pole line, an influencing quantity, generated by this filter, with a frequency content corresponding to a tone with the ordinal number $n=n_2$ and the frequency for a tone with the ordinal number $n=n_4$. FIGS. 7A and 7B also illustrate the fact that the four ordinal numbers mentioned are chosen so as not to coincide.

Figure 6C:
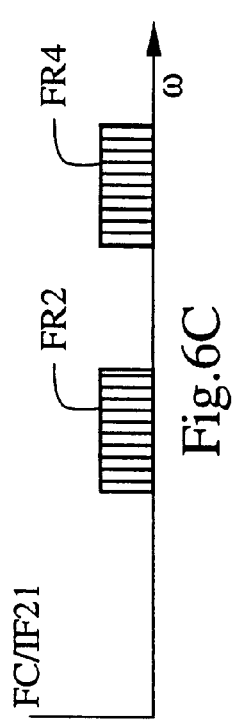
Figure 6D:
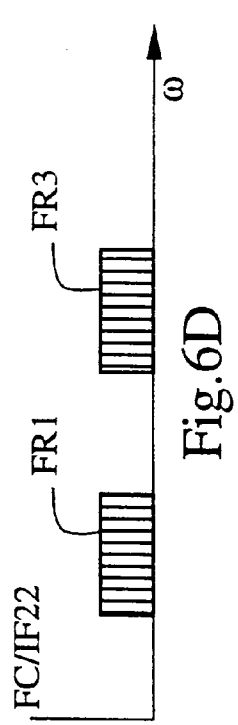

In still another advantageous improvement of the invention, a first pair of control equipment (CE11 and CE12 in FIG. 1), arranged, for example, according to any of the preceding examples, may be arranged in a first converter station (with converters CV11 and CV12 in FIG. 1) and a second pair of control equipment (CE21 and CE22 in FIG. 1), of a similar kind, be arranged in a second converter station (with converters CV21 and CV22 in FIG. 1). In this improvement of the invention, the filter AF11 in the first and the filter AF21 in the second converter station are adapted to supply the influencing quantity, generated by the respective filter, to that part of the dc link which comprises the first pole line and the filter AF12 in the first and the filter AF22 in the second converter station are adapted to supply the influencing quantity, generated by the respective filter, to that part of the dc link which comprises the second pole line. During bipolar operation of the converter stations, the frequency-selecting means in the control equipment for the active filter AF11 in the first converter station and the frequency-selecting means in the control equipment for the active filter AF22 in the second converter station are adapted to influence the frequency content of the influencing quantity generated by the respective filter to lie within the first frequency band, and the frequency-selecting means in the control equipment for the active filter AF12 in the first converter station and the frequency-selecting means in the control equipment for the active filter AF21 in the second converter station are adapted to influence the frequency content of the influencing quantity, generated by the respective filter, to lie within the second frequency band. This is illustrated in FIGS. 6C and 6D. In FIG. 6C, where the designation FC/IF21 means frequency content in the influencing quantity generated by the active filter AF21, that is, in the embodiment of the installation which is described with reference to FIG. 1, in the filter current IF21, the second frequency band FR2 is shown, and in FIG. 6D, where the designation FC/IF22 means frequency content in the influencing quantity generated by the second active filter, that is, in this case in the filter current IF22, the first frequency band FR1 is shown. The figures also illustrate the fact that the two frequency bands mentioned are chosen so as not to overlap each other. Otherwise, the same description applies to FIGS. 6C and 6D as for FIGS. 6A and 6B.

Figure 7C:
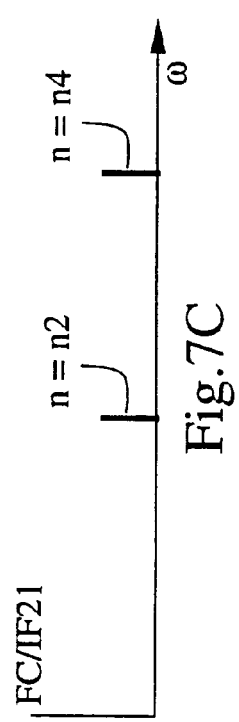
Figure 7D:
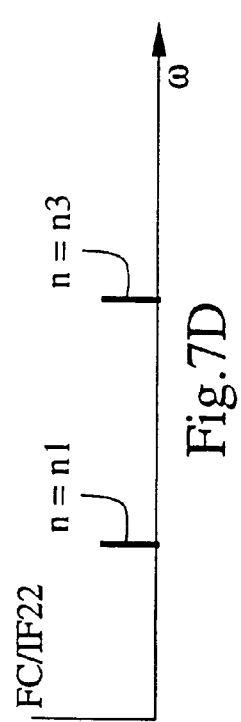

FIGS. 6C and 6D also illustrate the embodiments of the invention where, for each of the pieces of control equipment, the band-pass filtering units BP comprise additional band-pass filtering members such that, in this embodiment, the active filter AF21 on the first pole line supplies an influencing quantity, generated by this filter, with a frequency content which lies within the second frequency band FR2 and the fourth frequency band FR4, and the active filter AF22 on the second pole line supplies an influencing quantity, generated by this filter, with a frequency content which lies within the first frequency band FR1 and the third frequency band FR3. FIGS. 7C and 7D illustrate corresponding conditions in the event that the frequency-selecting means consist of single-tone controllers of the kind described with reference to FIG. 4.

By the above-mentioned arrangement of the pairs of control equipment, the interference between the two converter stations as well as between the two poles in the respective station is minimized.

The frequency bands for the respective active filter are advantageously chosen such that, during bipolar operation of the converter station, the power supplied by the filters on the respective parts of the dc link is distributed as equally as possible between the filters.

The invention is not limited to the embodiments shown but a plurality of modifications are feasible within the scope of the claims. For example, the band-pass filtering units may be formed in alternative ways, known to the person skilled in the art. The pieces of control equipment may, of course, also be designed to form influencing quantities with frequency content distributed over an arbitrary number of frequency bands.

By means of the invention, the active filters for the two poles within a converter station may operate independently of each other, which also implies that they do not need to be activated in a synchronous manner when the station is taking up power.

In the event that one of the filters for some reason, for example overload, must be taken out of operation, the other filter may be maintained in operation. By forming the frequency-selecting means, in some manner known per se, so that they are capable of being influenced, the latter filter may be adapted to temporarily assume the function of the filter which has been taken out of operation.

The number of frequency bands/frequencies, for which a reduction of the harmonics is obtained, may be doubled while maintaining the amount of hardware in each of the pieces of control equipment.

Any interference between two converter stations during bipolar operation may be avoided by choosing, for filters connected to the same pole line, different frequency bands for the two stations.

It is to be noted that, in those cases where a frequency band comprises one single frequency, this must not necessarily constitute an integer multiple of the system frequency. As mentioned above with reference to the control equipment described in unpublished Swedish patent application 9700897-3, the control units described therein are arranged for reduction of a tone of a tone frequency nω of the ac components of the direct current, where n is a real number different from zero. The pieces of control equipment according to the invention may thus, in this embodiment, be adapted to influence the frequency content of the respective influencing quantity to comprise specific arbitrary frequencies.

What is claimed is:

1. A pair of first and second control equipment (CE11, CE12) for a first and a second active filter (AF11, AF12), respectively, in a bipolar converter station for conversion between alternating current and high-voltage direct current, said filters being intended for reduction of harmonics in a dc link, connected to the converter station, with a first and a second pole line (PC1, PC2), respectively, whereby each of the filters, in dependence on an actual current value (SSI)

formed in dependence on a sum of harmonic currents in the respective pole line and supplied to a respective piece of control equipment, generates an influencing quantity (IF11, IF12) and supplies this to the dc link, the first filter on that part of the dc link which comprises the first pole line and the second filter on that part of the dc link which comprises the second pole line, characterized in that each of the pieces of control equipment comprises frequency-selecting means (BP, CTR) which influence the frequency content of the respective influencing quantity to lie essentially within one of a first and a second of at least two predetermined, mutually non-overlapping frequency bands (FR1, FR2) and that, during bipolar operation of the converter station, said frequency-selecting means in the control equipment for the first active filter influence the frequency content of the influencing quantity, generated by this filter, to lie within said first frequency band and said frequency-selecting means in the control equipment for the second active filter influence the frequency content of the influencing quantity, generated by this filter, to lie within said second frequency band.

2. A pair of control equipment according to claim 1, characterized in that said frequency-selecting means in the control equipment for the first filter influences the frequency content of the influencing quantity, generated by this filter, in addition thereto to lie essentially also within a third predetermined frequency band (FR3) which does not overlap said first and second frequency bands.

3. A pair of control equipment according to claim 2, characterized in that said second frequency band is located between said first and third frequency bands.

4. A pair of control equipment according to claim 1, characterized in that each of said frequency bands essentially comprises one single frequency (nω) constituting a multiple of the system frequency (ω) for an ac network connected to the converter station.

5. A pair of control equipment according to claim 4, characterized in that said single frequency constitutes an integer multiple (k) of a product of said system frequency and the pulse number (p) for a converter included in the converter station.

6. A pair of control equipment according to claim 1, characterized in that the frequency-selecting means comprise band-pass filtering members (BP1, BP2, BP3), each one with a frequency characteristic related to one of said first and second frequency bands, said band-pass filtering members being arranged at a respective current-sensing member (AV11, AV12) for forming the respective actual current value.

7. A pair of control equipment according to claim 1, each of the pieces of control equipment having a control device (CTR) and a deviation-forming unit (DEVU), characterized in that frequency-selecting means comprise band-pass filtering members (BP1, BP2, BP3), each one with a frequency characteristic related to one of said first and second frequency bands, said band-pass filtering members being arranged at a respective deviation-forming unit.

8. A pair of control equipment according to claim 1, each of the pieces of control equipment having a control device (CTR) comprising at least one single-tone controller (RD1, RD2, RD3) for cancellation of a tone (nω), selectable within at least said first and second frequency bands, characterized in that said frequency-selecting means consist of the single-tone controller.

9. A first and second pair of control equipment (CE11, CE12 and CE21, CE22, respectively) according to claim 1, of which the first pair is intended for a first converter station and the second pair for a second converter station, which are mutually connected by means of the dc link, and the first filters (AF11 and AF12, respectively) in the first and in the second converter station supply the influencing quantity, generated by the respective filter, to that part of the dc link which comprises the first pole line (PC1) and the second filters (AF12 and AF22, respectively) in the first and in the second converter station supply the influencing quantity, generated by the respective filter, to that part of the dc link which comprises the second pole line (PC2), characterized in that, during bipolar operation of the converter stations, the frequency-selecting means in the control equipment for the first active filter (AF11) in the first converter station and the frequency-selecting means in the control equipment (AF22) for the second active filter in the second converter station influence the frequency content of the influencing quantity, generated by the respective filter, to lie essentially within the first frequency band (FR1) and that the frequency-selecting means in the control equipment for the second active filter (AF12) in the first converter station and the frequency-selecting means in the control equipment for the first active filter (AF21) in the second converter station influence the frequency content of the influencing quantity, generated by the respective filter, to lie essentially within the second frequency band (FR2).

10. A method for reducing harmonics in a dc link with a first and a second pole line (PC1, PC2) by means of a pair of a first and a second active filter (AF11, AF12), said dc link being connected to a bipolar converter station for conversion between alternating current and high-voltage direct current, wherein an actual current value (SSI) is formed in dependence on a sum of harmonic currents in the respective pole line, each of the filters, in dependence thereon, generates an influencing quantity (IF11, IF12) and supplies this to the dc link, the first filter to that part of the dc link which comprises the first pole line and the second filter to that part of the dc link which comprises the second pole line, characterized in that during bipolar operation of the converter station, the frequency content of the influencing quantity generated by the first filter is influenced to lie substantially within at least one predetermined first frequency band (FR1), and the frequency content of the influencing quantity generated by the second filter is influenced to lie substantially within at least one predetermined second frequency band (FR2), said first and second frequency bands being mutually non-overlapping.

11. A method according to claim 10, characterized in that the frequency content of the influencing quantity, generated by the first filter, is influenced to lie, in addition thereto, also within a predetermined third frequency band (FR3) not overlapping said first and second frequency bands.

12. A method according to claim 11, characterized in that the frequency content of the influencing quantity, generated by the second filter, is influenced to lie substantially within a second frequency band which is located between said first and third frequency bands.

13. A method according to claim 10, characterized in that the frequency content of the influencing quantities, generated by the filters, are influenced to consist of tones (nω) constituting multiples of the system frequency (ω) for an ac network connected to the converter station.

14. A method according to claim 13, characterized in that said tones constitute integer multiples (p) of a product of said system frequency and the pulse number (p) for a converter included in the converter station.

15. A method according to claim 10, characterized in that the frequency content of the influencing quantities, generated by the filters, are influenced by means of filtering of the respective actual current values.

16. A method according to claim 10, characterized in that the frequency content of the influencing quantities, generated by the filters, are influenced by means of a control device (CTR), comprising at least one single-tone controller (RD1, RD2, RD3) for cancellation of a tone (nω) which is selected within at least said first and second frequency bands.

17. A method according to claim 10 for reducing harmonics in a dc link with a first and a second pole line (PC1, PC2) by means of a pair of active filters (AF11, AF12 and AF21, AF22, respectively), said dc link connecting a first and a second converter station for conversion between alternating current and high-voltage direct current, wherein the first pair is intended for the first converter station and the second pair for the second converter station, and the first filters (AF11 and AF21, respectively) in the first and in the second converter station supply the influencing quantity, generated by the respective filter, to that part of the dc link which comprises the first pole line (PC1) and the second filters (AF12 and AF22, respectively) in the first and in the second converter station supply the influencing quantity, generated by the respective filter, to that part of the dc link which comprises the second pole line (PC2), characterized in that during bipolar operation of the converter stations, the influencing quantities generated by the first active filter (AF22) in the first converter station and the second active filter (AF22) in the second converter station are influenced to lie essentially within the first frequency band (FR1), and the influencing quantities generated by the second active filter (AF12) in the first converter station and the first active filter (AF21) in the second converter station are influenced to lie essentially within the second frequency band (FR2).

* * * * *